(12) United States Patent
Faitelson et al.

(10) Patent No.: US 9,436,843 B2
(45) Date of Patent: *Sep. 6, 2016

(54) AUTOMATIC FOLDER ACCESS MANAGEMENT

(71) Applicant: Varonis Systems, Inc., New York, NY (US)

(72) Inventors: Yakov Faitelson, Elkana (IL); Ohad Korkus, Tel-Aviv (IL)

(73) Assignee: VARONIS SYSTEMS, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/669,989

(22) Filed: Mar. 26, 2015

(65) Prior Publication Data

US 2015/0199536 A1 Jul. 16, 2015

Related U.S. Application Data

(63) Continuation of application No. 13/944,362, filed on Jul. 17, 2013, now Pat. No. 9,009,795, which is a continuation of application No. 11/786,522, filed on Apr. 12, 2007, now Pat. No. 8,561,146.

(60) Provisional application No. 60/792,091, filed on Apr. 14, 2006.

(51) Int. Cl.
*G06F 21/00* (2013.01)
*G06F 21/62* (2013.01)
*G06F 21/60* (2013.01)

(52) U.S. Cl.
CPC ......... *G06F 21/6218* (2013.01); *G06F 21/604* (2013.01); *G06F 21/6227* (2013.01); *G06F 21/6236* (2013.01); *G06F 2221/2101* (2013.01)

(58) Field of Classification Search
None
See application file for complete search history.

(56) References Cited

U.S. PATENT DOCUMENTS 5,465,387 A 11/1995 Mukherjee
5,899,991 A 5/1999 Karch
(Continued)

FOREIGN PATENT DOCUMENTS

CN 1588889 3/2005

OTHER PUBLICATIONS

An Office Action dated Sep. 14, 2012, which issued during the prosecution of U.S. Appl. No. 12/861,967.
(Continued)

*Primary Examiner* — Saleh Najjar
*Assistant Examiner* — Devin Almeida
(74) *Attorney, Agent, or Firm* — Husch Blackwell LLP

(57) ABSTRACT

Methods and systems are provided for decentralizing user data access rights control activities in networked organizations having diverse access control models and file server protocols. A folder management application enables end users of the file system to make requests for access to storage elements, either individually, or by becoming members of a user group having group access privileges. Responsibility for dealing with such requests is distributed to respective group owners and data owners, who may delegate responsibility to authorizers. The application may also consider automatically generated proposals for changes to access privileges. An automatic system continually monitors and analyzes access behavior by users who have been pre-classified into groups having common data access privileges. As the organizational structure changes, these groups are adaptively changed both in composition and in data access rights.

18 Claims, 5 Drawing Sheets

(56) References Cited

U.S. PATENT DOCUMENTS

| | | | |
|---|---|---|---|
| 6,338,082 B1 | 1/2002 | Schneider | |
| 6,393,468 B1 | 5/2002 | McGee | |
| 6,928,439 B2 | 8/2005 | Satoh | |
| 6,993,137 B2* | 1/2006 | Fransdonk | 380/279 |
| 7,031,984 B2 | 4/2006 | Kawamura et al. | |
| 7,068,592 B1 | 6/2006 | Duvaut et al. | |
| 7,716,240 B2 | 5/2010 | Lim | |
| 2003/0048301 A1 | 3/2003 | Menninger | |
| 2003/0051026 A1 | 3/2003 | Carter et al. | |
| 2003/0231207 A1 | 12/2003 | Huang | |
| 2004/0030915 A1 | 2/2004 | Sameshima et al. | |
| 2004/0249847 A1 | 12/2004 | Wang et al. | |
| 2004/0254919 A1 | 12/2004 | Giuseppini | |
| 2005/0065823 A1 | 3/2005 | Ramraj et al. | |
| 2005/0086529 A1 | 4/2005 | Buchsbaum | |
| 2005/0120054 A1 | 6/2005 | Shulman et al. | |
| 2005/0203881 A1 | 9/2005 | Sakamoto et al. | |
| 2005/0246762 A1 | 11/2005 | Girouard et al. | |
| 2006/0184459 A1 | 8/2006 | Parida | |
| 2006/0277184 A1 | 12/2006 | Faitelson et al. | |
| 2007/0033340 A1 | 2/2007 | Tulskie et al. | |
| 2007/0061487 A1 | 3/2007 | Moore et al. | |
| 2007/0073698 A1 | 3/2007 | Kanayama et al. | |
| 2007/0112743 A1 | 5/2007 | Giampaolo et al. | |
| 2007/0156693 A1 | 7/2007 | Soin et al. | |
| 2007/0198608 A1 | 8/2007 | Prahlad et al. | |
| 2007/0203872 A1 | 8/2007 | Flinn et al. | |
| 2007/0266006 A1 | 11/2007 | Buss | |
| 2007/0276823 A1 | 11/2007 | Borden et al. | |
| 2007/0282855 A1 | 12/2007 | Chen et al. | |
| 2008/0172720 A1 | 7/2008 | Botz et al. | |
| 2008/0271157 A1 | 10/2008 | Faitelson et al. | |
| 2009/0119298 A1 | 5/2009 | Faitelson et al. | |
| 2009/0150981 A1 | 6/2009 | Amies et al. | |
| 2009/0320088 A1* | 12/2009 | Gill et al. | 726/1 |

OTHER PUBLICATIONS

An Office Action dated Dec. 14, 2010, which issued during the prosecution of Applicant's U.S. Appl. No. 11/789,884.

An Office Action dated Jul. 9, 2010, which issued during the prosecution of Applicant's U.S. Appl. No. 11/789,884.

An International Search Report and a Written Opinion, both dated May 20, 2010, which issued during the prosecution of Applicant's PCT/IL10/00069.

An International Search Report and a Written Opinion, both dated May 23, 2011, which issued during the prosecution of Applicant's PCT/IL11/00065.

An International Search Report and a Written Opinion, both dated Jun. 14, 2011, which issued during the prosecution of Applicant's PCT/IL11/00066.

An International Search Report and a Written Opinion, both dated May 24, 2011, which issued during the prosecution of Applicant's PCT/IL11/00077.

An Office Action dated Dec. 14, 2010, which issued during the prosecution of U.S. Appl. No. 11/786,522.

An Office Action dated Apr. 18, 2011, which issued during the prosecution of U.S. Appl. No. 11/786,522.

An Office Action dated Sep. 20, 2011, which issued during the prosecution of U.S. Appl. No. 11/786,522.

An Advisory Action dated Dec. 27, 2011, which issued during the prosecution of U.S. Appl. No. 11/786,522.

An Office Action dated Mar. 13, 2012, which issued during the prosecution of U.S. Appl. No. 11/786,522.

An Office Action dated May 22, 2013, which issued during the prosecution of U.S. Appl. No. 11/786,522.

A Notice of Allowance dated Jul. 10, 2013, which issued during the prosecution of U.S. Appl. No. 11/786,522.

* cited by examiner

AUTOMATIC FOLDER ACCESS MANAGEMENT

CROSS-REFERENCE TO RELATED APPLICATIONS

This application claims the benefit of U.S. Provisional Application No. 60/792,091, filed Apr. 14, 2006, which is incorporated herein by reference.

BACKGROUND OF THE INVENTION

1. Field of the Invention

This invention relates to computer security. More particularly, this invention relates to modification of user access permissions on a computer system.

2. Description of the Related Art

Data security policies typically determine who has access to an organization's stored data on various computer systems. These policies are rarely static. Users from within the organization, e.g., employees, partners, contractors, can pose a threat as severe as threats from outside the organization. Thus, as the structure and personnel makeup of the organization change, the security policy should be adjusted from time to time. Yet, information technology departments often find it difficult to manage user access rights and to ensure that needed information is conveniently available, while still protecting the organization's sensitive data.

Access control technologies have not been optimally implemented in enterprises that utilize diverse access control models. The state of the art today is such that there is no easy way for system administrators to know who is accessing what in such environments. As a result, in many organizations an unacceptably high proportion of users has incorrect access privileges. The related problems of redundant access rights and orphan accounts of personnel who have left the organization have also not been fully solved. Hence, there is a need for improvements in controlling user file permissions in order to improve data security, prevent fraud, and improve company productivity. Furthermore, misuse of data access, even by authorized users, is a concern of those charged with simplification and automation system security.

Current techniques available to information technology personnel include review and maintenance of access control lists, in conjunction with administration of user names, passwords, and the extension of such techniques to include bio-metrics, encryption, and limitation of access to a single sign-on. Such techniques are inefficient, often inaccurate, and become impractical in the context of large, complex organizations whose structure and personnel are constantly changing.

Aids to security are available for enterprises using particular operating systems or environments. These are often involve role-based access control, a technique that has been the subject of considerable interest for the last several years by governmental organizations, and has more recently been adopted in commercial enterprises.

SUMMARY OF THE INVENTION

According to disclosed embodiments of the invention, methods and systems are provided for decentralizing user data management activities, e.g., access requests, in networked organizations having diverse access control models and file server protocols. Storage elements within the organization have an ownership attribute. Within an organization's file system, there are typically many owners, each having ownership of a portion of the storage elements, e.g., folders, that are stored in the file system. Aspects of the invention enable these owners to control access rights to their respective portions.

In one aspect of the invention, a folder management application enables end users of the file system to make requests for access to storage elements, either individually, or by becoming members of a user group having group access privileges. Responsibility of dealing with such requests is distributed to respective data owners and group owners, who typically have diverse operational responsibilities in the enterprise. The owners may further delegate their responsibility to "authorizers". Additionally or alternatively, the folder management application may process proposals for changes to access privileges that are generated automatically. Generation of the proposals is accomplished by an automatic monitor that analyzes access behavior by users who have been pre-classified into groups having common data access privileges. As the organizational structure changes, these groups are adaptively changed both in composition and in data access rights. Proposals to vary user access rights are generated by the monitor. These proposals are intended to dynamically conform user access requirements to the needs of the organization.

The process of handling user requests and automatically generated requests is largely automated and vastly improves upon previous systems, which are either manual, or are concentrated in an information systems department of the organization.

An embodiment of the invention provides a computer-implemented method for controlling data access by users of a file system, which is carried out by receiving a request for a change in user access rights of one of the users to a designated storage element of the file system, wherein respective first portions of storage elements of the file system are owned by data owners that control the user access rights thereto. A user repository for the file system includes groups of users, wherein the groups have common access rights to respective second portions of the storage elements. The method is further carried out by identifying one of the groups, wherein the common access rights of the identified group include the designated storage element, obtaining a consent to the request from the data owner of the designated storage element, and responsively to the consent adjusting a membership of the one user in the identified group to conform the access rights of the one user to the designated storage element to the request.

An additional aspect of the method includes establishing at least one data authorizer to act on behalf of the data owner, wherein the consent is obtained from the at least one data authorizer.

In still another aspect of the method, the identified group has a group owner that controls the membership thereof, and the method is further carried out by obtaining a concurrence from the group owner of the identified group to change the membership of the One user therein.

One aspect of the method includes establishing at least one group authorizer to act on behalf of the group owner, wherein the concurrence of the group owner is obtained from the at least one group authorizer.

In another aspect of the method, the request includes an addition of access rights of the one user to the designated storage element and adjusting a membership comprises accepting the one user as a member of the identified group.

Yet another aspect of the method includes monitoring accesses of the users to the storage elements and deriving respective access profiles thereof, and responsively to the access profiles automatically generating the request.

Still another aspect of the method includes automatically defining the groups responsively to the access profiles.

In a further aspect of the method, the request includes a deletion of access rights of the one user to the designated storage element and adjusting a membership comprises removing the one user as a member of the identified group.

An additional aspect of the method includes establishing a rule having at least one satisfaction criterion, determining that the request complies with the criterion, and responsively to the determination, consenting to the request automatically.

Computer software product and apparatus are provided in other embodiments of the invention for carrying out the aforedescribed method.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

Figure 1:
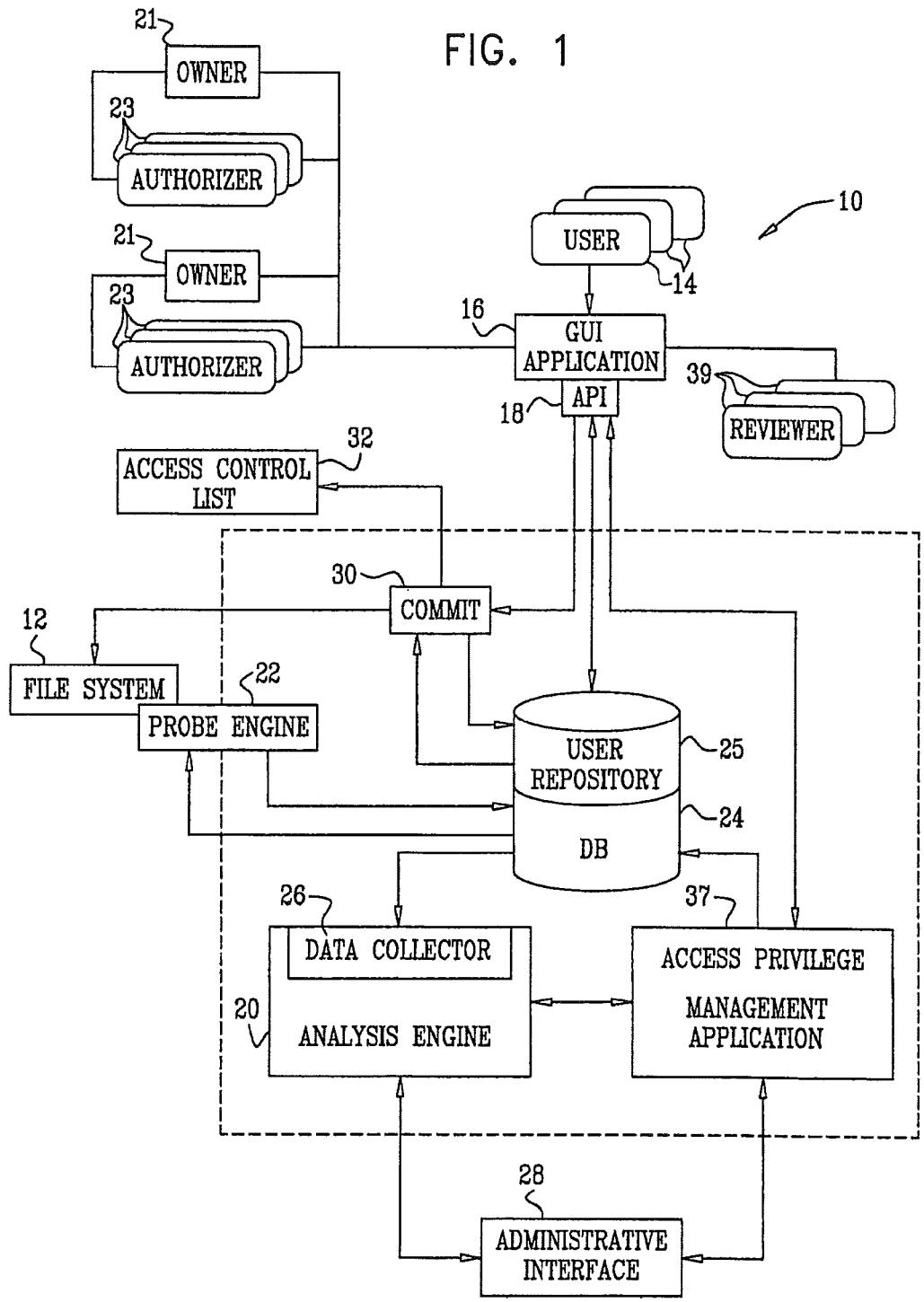
FIG. 1 is a block diagram of a data processing system 10, wherein data access rights management is decentralized in accordance with a disclosed embodiment of the invention.

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code, which embodies aspects of the present invention, is typically maintained in permanent storage, such as a computer readable medium. In a client-server environment, such software programming code may be stored on a client or a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems.

Terminology.

Table 1 explains certain terminology used herein.

TABLE 1

| | |
|---|---|
| Base Folder | A root managed directory. A storage folder or directory that is managed by one or more data owners. Can only be defined by administrators. Contains managed directories. |
| Managed Directory | A storage folder or directory to which users can request access. It has an owner, at least one authorizer, and at least one monitored access control list. |
| Managed Group | A defined group of users with the following properties: 1 An associated group owner. 2 At least one associated authorizer. |
| ACL | Access control list. A list of permissions attached to an object. The list specifies who or what is allowed to access the object and what operations are allowed to be performed on the object. In a typical ACL, each entry specifies a subject and an operation: for example, the entry (Alice, delete) on the ACL for file XYZ gives Alice permission to delete file XYZ. |
| Automatic Rule | A rule or a set of rules that specify criteria for automatic approval of data access requests and group membership requests. |
| Authorization Rule | A rule that enforces an additional level of authorization, e.g., automatically designating a set of authorizers for a request that meets criteria defined by the rule. |
| Location | A hierarchical tree representing the organization's shared drives that contain base folders. |
| Organizational unit. | An user repository container that can include users, groups, computers, and other organizational units. They are often defined to mirror an organization's functional or business structure. |

Overview.

Typically, in business organizations an information technology department is responsible for data access authorizations across the enterprise. However, information technology personnel are often not well positioned to evaluate business needs or data sensitivity. The data owner, e.g., an account manager, may not be aware of user requests to view data under his aegis. Third party reviewers, such as the legal department of the enterprise may also be unable to routinely provide input into the process.

In one aspect of the invention, control of access rights to storage elements of an organizational file system is decentralized to respective owners of the storage elements and their delegatees. For example, end users may request access to storage elements, either individually or by application to join one or more user groups having common data access rights. Such user groups may be interactively established by administrators or owners using the folder management application. Additionally or alternatively, user groups may be automatically established using biclustering techniques, which are disclosed in commonly assigned application Ser. No. 11/258,256, entitled "Automatic Management of Storage Access Control", and which is herein incorporated by reference. The responsibility of dealing with such requests and managing other changes in access privileges to storage elements in the file system devolves upon respective owners of the storage elements, who may further delegate responsibility for the same or different portions of the storage elements falling under their responsibility to "authorizers".

The folder management application may also deal with proposals for changes to access privileges that are received from an automatic system, which is disclosed in the above-noted application Ser. No. 11/258,256. Briefly, access to storage elements within an organizational network is continually monitored and analyzed in order to define user data access profiles and simultaneous data access groupings and user groupings. The actual organizational structure is learned from these groupings, and becomes the basis for dynamic data access control proposals, which are constantly adapted to organizational changes over time. These proposals are considered and acted upon by decentralized managers of file access control as described below.

Turning now to the drawings, reference is initially made to FIG. 1, which is a block diagram of a data processing system 10, wherein data access management is decentralized in accordance with a disclosed embodiment of the invention. The system 10 may be implemented as a general purpose computer or a plurality of computers linked together in a network, for example the Internet. Thus, although the system 10 is shown as comprising a number of separate functional blocks, these blocks are not necessarily separate physical entities, but rather represent different computing tasks or data objects stored in a memory that is accessible to the processor. These tasks may be carried out in software running on a single processor, or on multiple processors. The software may be provided to the processor or processors on tangible media, such as CD-ROM or non-volatile memory. Alternatively or additionally, the system 10 may comprise a digital signal processor or hard-wired logic.

Organization-wide data storage accessible by the system 10 is represented by an organizational file system 12. The file system 12 may comprise one or more co-located storage units, or may be a geographically distributed data storage system, as is known in the art. There is no requirement that individual storage units of the file system 12 have the same capabilities. Storage elements in the file system 12 have an ownership attribute. Within an organization's file system, there are typically many owners 21, each having ownership of a portion of the storage elements, e.g., folders, that are stored in the file system.

The file system 12 may be accessed by any number of users 14 using a graphical user interface application 16 (GUI), which relates to other elements of the system 10 via an application programming interface 18 (API). The users 14 are typically members of the organization, but may also include outsiders, such as customers. The graphical user interface application 16 is the interface of the management system, through which the users 14 can receive the results of their actual usage analysis, as determined an analysis engine 20. Sufficiently qualified users, owners 21 and their delegatees, authorizers 23, can view their current status, and can view changes recommended by the system. The owners 21 and authorizers 23 are authorized to accept or reject recommended or requested changes. In a complex organization, the owners 21 may be executives of a business unit, and the authorizers 23 would be their subordinates. There may be any number of authorizers 23 associated with different owners 21, and different authorizers 23 may be authorized to control the same or different portions of the storage elements in the file system 12 that are owned by the associated owner.

A probe engine 22 is designed to collect historical user access information from the file system 12 in an ongoing manner, filter out duplicate or redundant information units and store the resulting information stream in a database 24 (DB). The probe engine 22 is also utilized to collect information related to the organization's current file security policy, the current structure of the file system 12, and information about the users 14. The probe engine 22 can be implemented in various environments and architectures.

The database 24 is linked to a user repository 25, which maintains a list of user identifications, states, roles, group memberships, and passwords. The user repository 25 can be realized as the Active Directory service, available from Microsoft Corporation, Redmond, Wash. The user repository 25 is a logical unit that may be distributed in one or more enterprise servers, e.g., a domain controller. In addition to user information, the user repository 25 facilitates assignment of enterprise-wide policies, deployment of programs, and application of critical updates to the entire organization.

The analysis engine 20 is a specialized module that deals with defining normal activity profiles and detecting atypical or exceptional data access activity by the users 14. The front end for the analysis engine 20 is a data collector 26, which efficiently records the storage access activities in the database 24. The output of the analysis engine 20 can be further manipulated using an interactive administrative interface 28 that enables system administrators to perform queries on the collected data.

In some embodiments, the analysis engine 20 is configured to evaluate the effects of proposed changes in data access rights. Performance of this evaluation is described in commonly assigned application (STC File No. 60579, entitled "Evaluating Removal of Access Permissions"), which is herein incorporated by reference. The owners 21 and authorizers 23 then have the ability to view a report of operation of the analysis engine 20 prior to prior to acting upon any proposed changes in data access privileges. Briefly, proposed removals of users from groups with common data access privileges or removal of privileges of such groups to access specified storage elements are validated prior to actual implementation. This is done by determining (1) that the users do not have alternative means of accessing the same data through membership in other groups, and (2) by determining that historical user accesses would still be allowable by proposed residual access rights.

Related to the analysis engine 20 is a commit module 30, which verifies ongoing user compliance with a governing or proposed security policy, using data collected prior to its implementation. The commit module 30 references an access control list 32 (ACL). Activities of the commit module 30 are described in further detail in the above noted application Ser. No. 11/258,256.

A specialized access privilege management application 37 is linked to users 14, owners 21 and authorizers 23 via the interface 18 and the user interface application 16. The management application 37 may query and receive additional input from the analysis engine 20. The management application 37, which is described in detail hereinbelow, is at the heart of the ability of the owners 21 and authorizers 23 to control the composition of user groups and to regulate data access rights of individual users 14. Third party reviewers 39 are also linked to the management application 37.

Folder Management Application.

Referring again to FIG. 1, it will be seen from the discussion of FIG. 5 below that the management application 37 provides a framework for the decentralization of data access rights authorization from a central control unit to local units, e.g., from an information technology department to business units. The management application 37 enables controlling authorities, i.e., the owners 21 and authorizers 23, to be accountable for resources under their ownership and management. The management application 37 enables creation and authorization of requests to change permissions for data access, and requests for changes in group membership.

Roles.

Several roles are defined for the management application 37. As part of the responsibilities of the roles outlined below, the management application 37 enables designated authorizers and third party reviewers across an organization to grant or deny requests. Such authorization review further enhances the organization's accountability and transparency.

Administrators, typically belonging to an information technology department, are responsible for the managing the following areas and personnel: other administrators; locations; shared drives; base folders; assignment of data owners to base folders; assignment of group owners to groups; floor support personnel; defining permission types; and establishment of synchronization reports.

Data owners perform the following activities relating to managed directories: adding and removing managed directories; adding and removing automatic rules and authorization rules; adding and removing authorizers; granting permissions; and acting on user requests for access to data. As noted above, granting such requests actually entail adding users to the relevant groups. Essentially, data owners establish authorization roles, set priorities, and manage accountability. Data owners also have responsibility for synchronizing the storage elements under his responsibility with the managed environment of the management application 37, a function that is explained below. An exemplary data owner in a business enterprise is the organization's marketing director.

Group owners perform the following activities relating to managed groups: adding and removing managed groups; adding and removing users to managed groups under their control; adding and removing automatic rules and authorization rules; adding and removing authorizers; and acting on requests for group membership.

Authorizers are responsible for acting on requests within areas of responsibility that are delegated to them by owners or data owners. Multiple levels of authorization may be defined in accordance with a governing security policy. For example, an authorizer might consider business need in deciding whether to authorize a user request. Third party reviewers, such as an organization's legal department, may have veto power, and in this way participate in a role of authorizer.

Floor Support personnel can view all requests whose status is pending.

Users access the management application 37 to request access to data and track the status of their requests. A user may actually be a set of users, in which case the procedures described below are performed iteratively and recursively as appropriate.

Finally, webmasters are responsible for system configuration.

Figure 2:
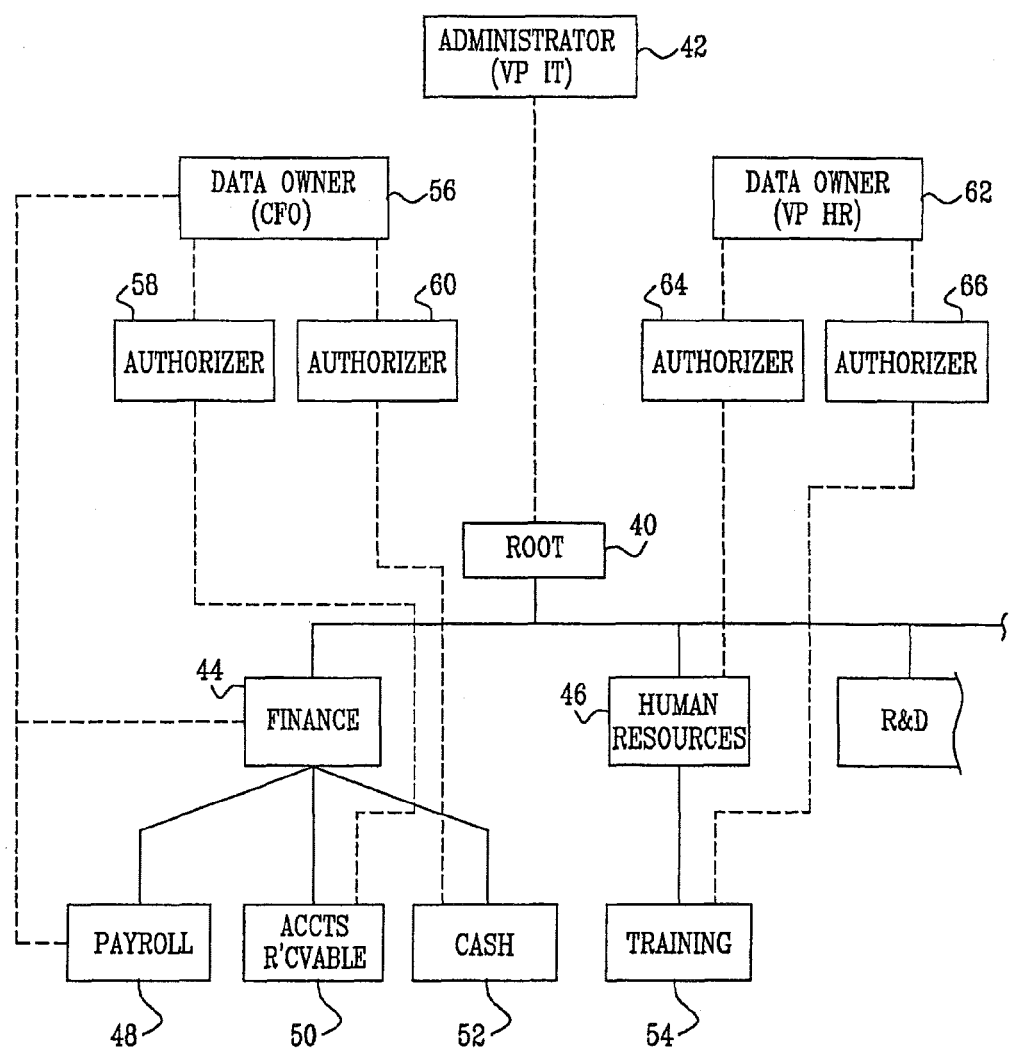
FIG. 2 is a simplified block diagram illustrating the devolution of responsibility for management of storage elements in the file system of FIG. 1, in accordance with a disclosed embodiment of the invention.

Reference is now made to FIG. 2, which is a simplified block diagram illustrating devolution of responsibility for management of data access rights in an exemplary instance of the enterprise file system 12 (FIG. 1), in accordance with a disclosed embodiment of the invention. In FIG. 2 lines associated with administrative responsibility and control are broken. The file system 12 has a root folder or root directory 40, control of which is limited to a high level administrator 42 (VP IT), who could be the head of the organization's information technology department.

In a hierarchical level below the root directory 40 are base folders 44, 46, which contain storage elements relating to the financial and human resource activities of the enterprise, respectively. The base folder 44 contains subsidiary folders 48, 50, 52, which hold content relating to payroll, accounts receivable, and cash-on-hand, respectively. The base folder 46 contains one subsidiary folder 54, which holds content relating to training activities. Of course, a substantial business enterprise has many other activities in its organizational structure, which would correspond to other folders and hierarchical levels of subfolders (not shown) in the file system 12.

A data owner 56 has responsibility for the base folder 44 and its subsidiary folders 48, 50, 52. Here the data owner 56 is the organizations chief financial officer (CFO). He has retained direct authority over the base folder 44 and the folder 48, and has appointed two authorizers 58, 60 to manage the folders 50, 52, respectively.

A data owner 62 has administrative responsibility for the base folder 46 and its subsidiary folder 54. In this example, the data owner 62 is the organization's vice president for human resources (VP ER). His management approach delegates responsibility to a greater extent than that of the data owner 56. The data owner 62 has appointed authorizers 64, 66. The authorizer 64 has direct responsibility for the base folder 46. The authorizer 66 is responsible for the folder 54.

It will be apparent that many combinations of direct and delegated responsibility are possible in the system 10 (FIG. 1), in order to accommodate various philosophies of management that may be found within the enterprise.

User Request for Data Access.

In the ordinary course of work, users often need access to a specific file or directory for which they do not have permission to access. When this happens, users interact with the management application 37 to generate explicit permission requests. In complex organizations, it has been found that such permissions are best assigned by adjusting user group memberships rather than directly granting individuals access permissions. A user's request for access rights is automatically converted to an appropriate group membership request. If the user is granted membership in a group, the user may access all the data to which that group has access rights.

Graphical User Interface.

The user interface application 16 comprises a graphical user interface for the management application 37. A menu bar offers the following selections:

A "summary" option displays summaries of previous requests.

A "pending requests" option displays details of pending requests.

A "make request" option enables a user to request new data access rights.

An "owner" option offers functions limited to data owners or group owners. These functions are noted above in the section entitled "Roles".

An "authorizer" option offers functions limited to authorizers.

An "administrator" option offers functions limited to administrators.

A "reports" option offers functions generally available to all roles. However, only administrators can generate synchronization reports.

An "application settings" is used to configure the management application 37. This selection is limited to webmasters.

Figure 3:
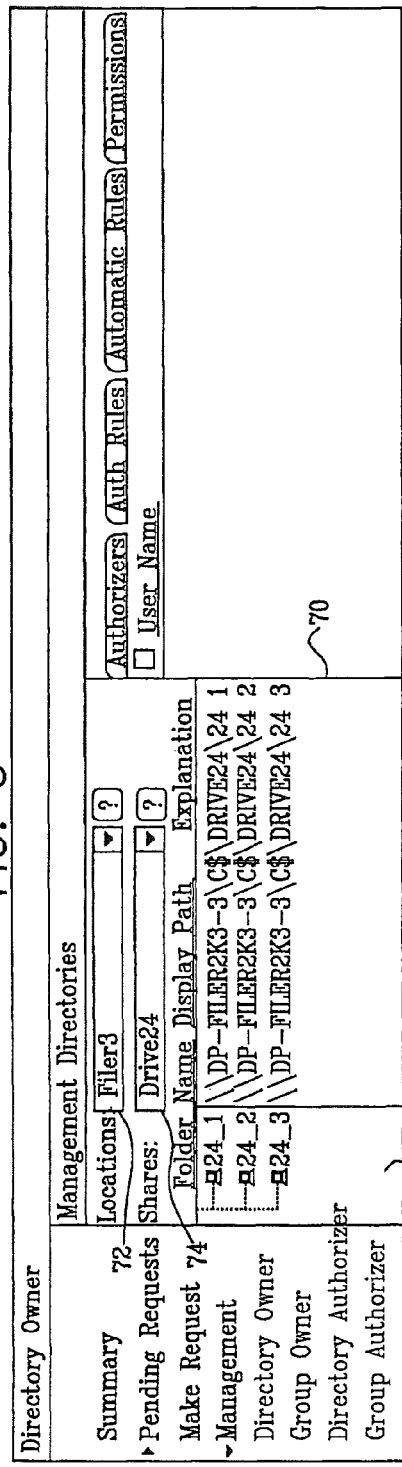
FIG. 3 is a screen display produced by a folder access management application in accordance with a disclosed embodiment of the invention.

For example, a data owner may add a new managed directory using the facilities of the folder management application 37. Reference is now made to FIG. 3, which is an exemplary screen display 68 produced by a folder access management application in accordance with a disclosed embodiment of the invention. The screen display 68 is brought up by selection of the owner option, which enables the owner to create a new managed directory. A pane 70 presents drop-down lists 72, 74, on which the location and shared drive of the new managed directory's base directory resides can be chosen, respectively. The data owner selects an entry in a folder name column 76, which holds a list of base folders. The selection indicates the base folder in which the new managed directory is to be created.

Figure 4:
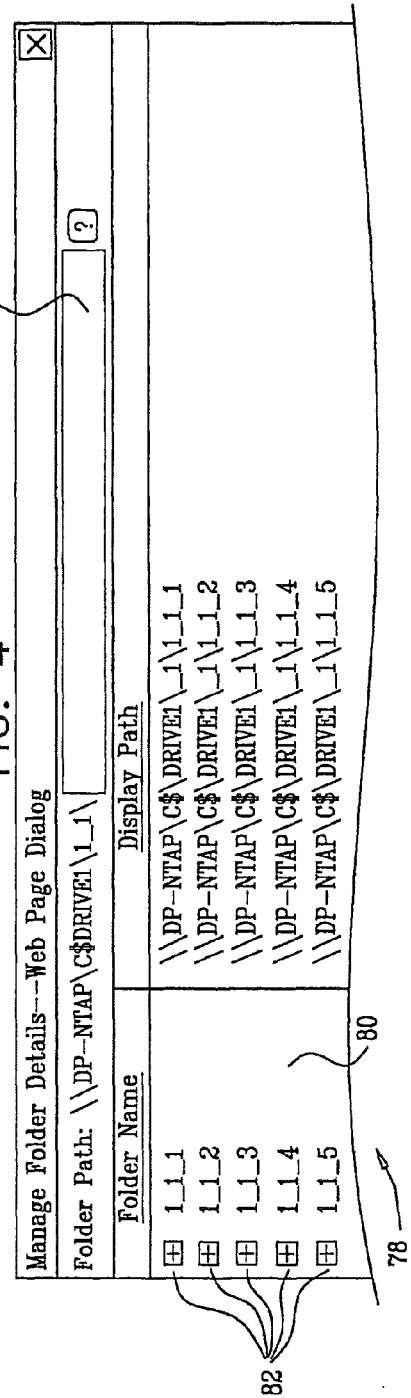
FIG. 4 is a screen display produced by a folder access management application showing managed directory details in accordance with a disclosed embodiment of the invention.

Reference is now made to FIG. 4, which is a screen display 78 of the folder access management application of FIG. 3, showing managed directory details in accordance with a disclosed embodiment of the invention. The screen display 78 is presented upon selection of an entry in the column 76 (FIG. 3). To set the new managed directory's path, one of the following actions is performed:

In a folder name column 80, a navigation tree of an entry may be expanded. The navigation trees are indicated by iconic symbols 82. Thereafter, a directory (not shown) in which the managed directory is to reside can be chosen.

Alternatively, the path of the directory in which the managed directory is to reside can be entered in a text box 84.

When accepted, the managed directory is created under the relevant directory.

Other role functions listed above may be executed using similar screen displays and dialog boxes of the graphical user interface. For example, screen displays (not shown) are provided for group owners to add and remove users from groups, add and remove authorizers for managed groups, view details of authorizers, and managed authorization rules and automatic rules for managed groups. In another example, screen displays (not shown) are provided to enable authorizers to conveniently accept or deny user requests.

Rules.

Authorization rules enable automatic authorization of actions requiring a decision by a designated authorizer or set of authorizers when criteria of the rules are met. For example, such rules can avoid chain-of-command distortions that could arise, for example, if a low level clerk were to deny a request by a high-ranking executive of the enterprise.

Automatic rules are similar to authorization rules. If satisfied by a user request, they enable the system to automatically act on such requests without intervention of authorizers or owners. Normally, such automatic rules allow the system to automatically grant routine requests, e.g., requests for read-only access to data that is deemed to be non-sensitive. For example, an automatic rule may specify automatic granting of requests by personnel having a particular rank or title to access data that reside in specified base folders.

The graphical user interface of the management application 37 (FIG. 1) allows creation and management of automatic rules and authorization rules by users having appropriate roles. Textual entries are then converted to regular expressions.

Synchronization.

Referring again to FIG. 1, the state of managed directories is maintained in the database 24. When changes are made in the state of managed directories, data owners can synchronize the state of a managed directory with the database 24, thereby committing changes they have made to the database. The graphical user interface offered by the management application 37 has facilities for initiating such synchronization operations. A screen display (not shown) assists the data owner by displaying the changes made to the managed directory since the last synchronization.

The management application 37 can generate a synchronization results report, which indicates the differences between the state of the database 24 and the states of the user repository 25 and the file system 12. The report is based on the most recent execution of a synchronization task.

Operation.

The methods described below can be carried out by the system 10 (FIG. 1). It should be noted that the steps of these methods are performed automatically, or responsively to decisions taken by personnel who are generally assigned outside the information technology department.

Figure 5:
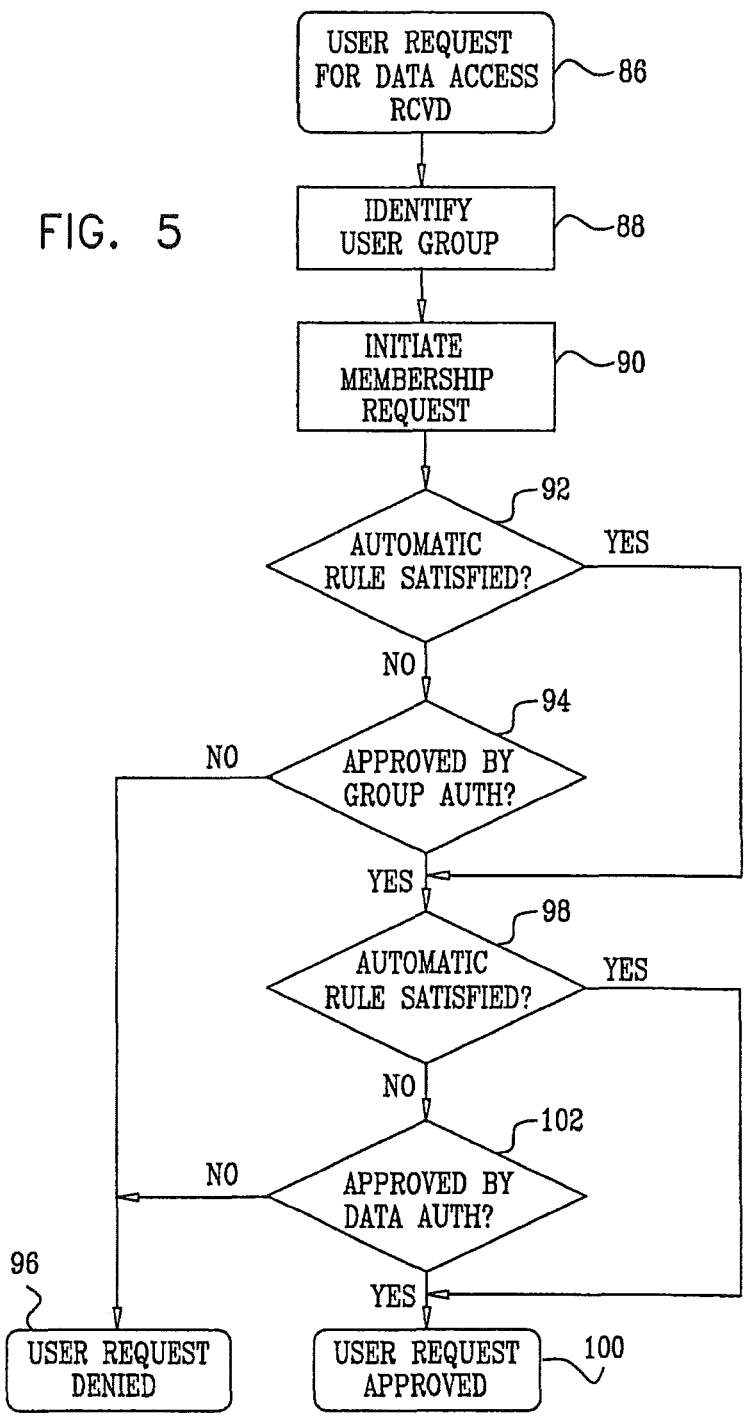
FIG. 5 is a flow chart of a method of processing a request for data access rights in accordance with a disclosed embodiment of the invention.

Reference is now made to FIG. 5, which is a flow chart of a method of processing a request for data access rights in accordance with a disclosed embodiment of the invention. At initial step, 86 a user request for access to a storage element is received.

Next, at step 88, a user group (also known as a "security group") having access rights to the requested storage element is identified. Each managed directory is associated with at least one user group, to which users who request access to the directory are mapped. If there a need for a new user group to be created in order to accommodate the request, this is done automatically, using a special organizational unit, which can be located anywhere within the user repository 25 (FIG. 1).

Next, at step 90 a membership request is generated in which an application is made for the user to join the user group identified in step 88. Two levels of approval are required for the membership request. The membership request is publicized to all authorizers for the user group. This may be done using an electronic messaging system, e.g., internal email.

Control now proceeds to decision step 92, where it is determined if the request satisfies an automatic rule that has been established by the group owner. This is done by regular expression matching, which is well known in the art. If the determination at decision step 92 is affirmative, then control proceeds to decision step 98, which is described below.

If the determination at decision step 92 is negative, then control proceeds to decision step 94, where it is determined if user membership in the specified user group is acceptable to the group owner. This step requires human intervention. The question in most cases reduces to approval by all the authorizers for the group owner, or by the group owner itself, if no authorizers have been designated. Alternatively, if an authorization rule in force for the group is satisfied, the determination in decision step 94 is made by the set of authorizers designated by the authorization rule. In either case, if the determination at decision step 94 is negative, then control proceeds to final step 96. The user's request is denied.

If the determination at decision step 94 is affirmative, then control proceeds to decision step 98, where it is determined if the requests satisfies an automatic rule that has been established by the data owner. Decision step 98 is performed in the same manner as decision step 92.

If the determination at decision step 98 is affirmative, then control proceeds directly to final step 100, which is described below.

If the determination at decision step 98 is negative, then control proceeds to decision step 102, where it is determined if the user's request is acceptable to the data owner. This step, like decision step 94, requires human intervention. The question reduces to approval by all authorizers of the particular folder or storage element or by the data owner itself, if no authorizers have been designated.

If the determination at decision step 102 is negative, then control proceeds to final step 96. Otherwise, control proceeds to final step 100, at which the user's request is approved. The user is added to the specified user group, and has rights to access the requested data together with the other group members. The procedure terminates. In final steps 96, 100, a notification, such as an email may be sent to the user informing him of the action on the request.

Access Rights Removal.

Figure 6:
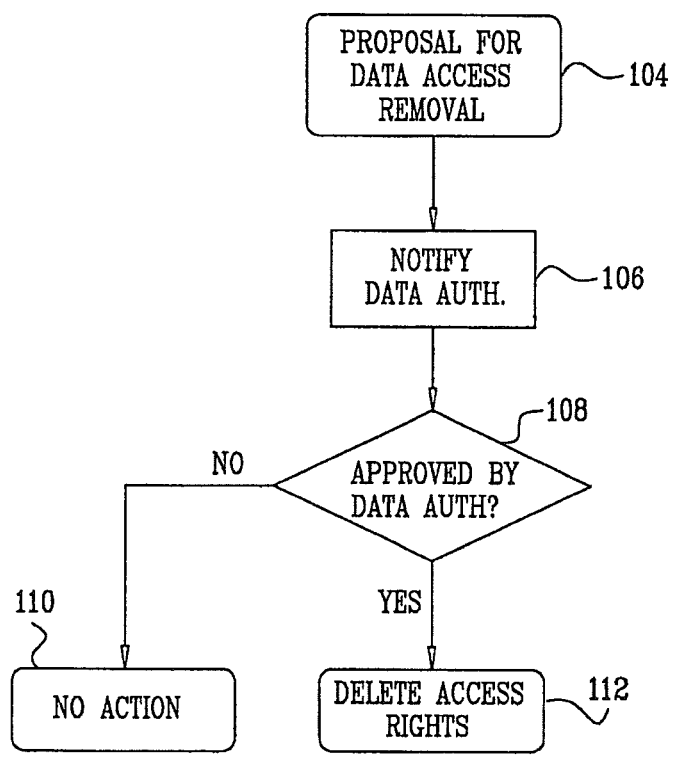
FIG. 6 is a flow chart of a method for removing a user's data access rights in accordance with a disclosed embodiment of the invention.

The management application 37 (FIG. 1) is adapted to deal with proposals to remove data access rights from a user. Reference is now made to FIG. 6, which is a flow chart of a method for removing a user's data access rights in accordance with a disclosed embodiment of the invention.

At initial step 104 a proposal to remove a user's data access rights to a storage element, e.g., a folder, is received. As noted above, such proposals may be generated automatically, in the course of operation of the monitoring system disclosed in the above-noted application Ser. No. 11/258, 256. Additionally or alternatively, such proposals may be received as third-party requests, for example, from auditors or others having responsibility for data security, or even from the user himself.

Next, at step 106, a notification is sent to the authorizers designated by the data owner of the relevant storage element. If there are no authorizers, the notification is sent to the data owner. This may be accomplished by internal email or similar messaging systems.

Control now proceeds to decision step 108, where it is determined if the proposal is acceptable to the recipients of the notification sent in step 106. If the determination at decision step 108 is affirmative, then control proceeds to final step 110. The user's access rights to the storage element are terminated. A message may be sent to the affected user or his supervisors, advising him of the action.

If the determination at decision step 108 is negative, then control proceeds to final step 112. No further action is necessary, although optionally notifications may be sent to the affected user or his supervisors. The procedure terminates.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A computer-implemented method for controlling data access by users of a file system, comprising the steps of:
   receiving a request for a change in user access rights of one of said users to a designated storage element of said file system, wherein said file system comprises storage elements, including said designated storage element, each of said storage elements being owned by a data owner that controls said user access rights thereto and the content thereof and has at least one of responsibility and accountability for said content, and a user repository including groups of said users, wherein users in each of said groups have common access rights to said storage elements;
   identifying one of said groups, wherein said identified group has a group owner that controls said membership thereof;
   establishing at least one group authorizer to act on behalf of said group owner;
   obtaining a consent to said request from said data owner of said designated storage element; and
   one of:
      obtaining a concurrence from said at least one group authorizer acting on behalf of said at least one group owner of said identified group to change said membership of said one user therein; and
      obviating said obtaining said concurrence from said at least one group authorizer acting on behalf of said at least one group owner of said identified group by automatically obtaining said concurrence; and
   responsively to said consent and to said concurrence conforming said user access rights of said one user to said designated storage element to said request by granting said user membership in said identified group or by revoking from said user membership in said identified group.

2. The method according to claim 1, further comprising the step of establishing at least one data authorizer to act on behalf of said data owner, wherein said step of obtaining a consent comprises obtain said consent from said at least one data authorizer.

3. The method according to claim 1, wherein said identified group has a group owner that controls said membership thereof, further comprising the step of obtaining a concurrence from said group owner of said identified group to change said membership of said one user therein.

4. The method according to claim 3, wherein said request comprises an addition of said user access rights of said one user to said designated storage element and said step of adjusting a membership comprises accepting said one user as a member of said identified group.

5. The method according to claim 3, further comprising the steps of:
   monitoring accesses of said users to said storage elements and deriving respective access profiles thereof; and
   responsively to said access profiles automatically generating said request.

6. The method according to claim 5, further comprising the step of automatically defining said groups responsively to said access profiles.

7. The method according to claim 1, wherein said request comprises a deletion of said user access rights of said one user to said designated storage element and said step of adjusting a membership comprises removing said one user as a member of said identified group.

8. The method according to claim 1, further comprising the steps of:
   establishing a rule having at least one satisfaction criterion;
   determining that said request complies with said criterion; and
   responsively to said step of determining performing said step of obtaining a consent to said request automatically.

9. A computer software product for controlling data access by users of a file system, including a non-transitory tangible computer-readable medium in which computer program instructions are stored, which instructions, when read by a computer, cause the computer to receive a request for a change in user access rights of one of said users to a designated storage element of said file system, wherein said file system comprises storage elements, including said designated storage element, each of said storage elements being owned by a data owner that controls said user access rights thereto and the content thereof and has at least one of responsibility and accountability for said content, and a user repository including groups of said users, wherein users in each of said groups have common access rights to said storage elements, said computer being caused by said instructions to identify one of said groups, wherein said identified group has a group owner that controls said membership thereof, to establish at least one group authorizer to act on behalf of said group owner, to obtain a consent to said request from said data owner of said designated storage element, and to either obtain a concurrence from said at least one group authorizer acting on behalf of said at least one group owner of said identified group to change said membership of said one user therein or obviate said obtaining said concurrence from said at least one group authorizer acting on behalf of said at least one group owner of said identified group by automatically obtaining said concurrence, and responsively to said consent and to said concurrence to thereby conform said user access rights of said one user to said designated storage element to said request by granting said user membership in said identified group or by revoking from said user membership in said identified group.

10. The computer software product according to claim 9, wherein said identified group has a group owner that controls said membership thereof, further wherein said computer is further instructed to obtain a concurrence from said group owner of said identified group to change said membership of said one user therein.

11. The computer software product according to claim 10, wherein said request comprises an addition of said user access rights of said one user to said designated storage element and said computer is further instructed to add said one user as a member of said identified group.

12. The computer software product according to claim 9, wherein said request comprises a deletion of said user access rights of said one user to said designated storage element and wherein said computer is further instructed to remove said one user as a member of said identified group.

13. The computer software product according to claim 9, further wherein said computer is further instructed to instantiate a rule having at least one satisfaction criterion, make a determination that said request complies with said criterion, and responsively to said determination automatically provide said consent to said request.

14. A data processing apparatus for controlling data access by users of a file system, comprising:
   a processor; and
   a memory accessible to said processor having instructions resident therein, said processor operative by executing said instructions to receive a request for a change in user access rights of one of said users to a designated storage element of said file system, wherein said file system comprises storage elements, including said designated storage element, each of said storage elements being owned by a data owner that controls said user access rights thereto and the content thereof and has at least one of responsibility and accountability for said content, and a user repository including groups of said users, wherein users in each of said groups have common access rights to said storage elements, to identify one of said groups, wherein said identified group has a group owner that controls said membership thereof, to establish at least one group authorizer to act on behalf of said group owner, to obtain a consent to said request from said data owner of said designated storage element and to either obtain a concurrence from said at least one group authorizer acting on behalf of said at least one group owner of said identified group to change said membership of said one user therein or obviate the need to obtain said concurrence from said at least one group authorizer acting on behalf of said at least one group owner of said identified group by automatically obtaining said concurrence, and responsively to said consent and to said concurrence to thereby conform said user access rights of said one user to said designated storage element to said request by granting said user membership in said identified group or by revoking from said user membership in said identified group.

15. The data processing apparatus according to claim 14, wherein said identified group has a group owner that controls said membership thereof, further wherein said processor is operative to obtain a concurrence from said group owner of said identified group to change said membership of said one user therein.

16. The data processing apparatus according to claim 15, wherein said request comprises an addition of said user access rights of said one user to said designated storage element and said processor is instructed by said instructions to add said one user as a member of said identified group.

17. The data processing apparatus according to claim 14, wherein said request comprises a deletion of said user access rights of said one user to said designated storage element and said processor is operative to remove said one user as a member of said identified group.

18. The data processing apparatus according to claim 14, further wherein said processor is operative to instantiate a rule having at least one satisfaction criterion, make a determination that said request complies with said criterion, and responsively to said determination automatically provide said consent to said request.

* * * * *